US012685993B2

(12) United States Patent
Burba

(10) Patent No.: US 12,685,993 B2
(45) Date of Patent: Jul. 21, 2026

(54) SORBENT FOR LITHIUM EXTRACTION FROM BRINES

(71) Applicant: International Battery Metals, Ltd., Houston, TX (US)

(72) Inventor: John L. Burba, Houston, TX (US)

(73) Assignee: International Battery Metals, Ltd, Houston, TX (US)

( * ) Notice: Subject to any disclaimer, the term of this patent is extended or adjusted under 35 U.S.C. 154(b) by 0 days.

(21) Appl. No.: 18/650,375

(22) Filed: Apr. 30, 2024

(65) Prior Publication Data

US 2025/0332567 A1      Oct. 30, 2025

(51) Int. Cl.
| | |
|---|---|
| *C02F 1/28* | (2023.01) |
| *B01J 20/04* | (2006.01) |
| *B01J 20/28* | (2006.01) |
| *B01J 20/30* | (2006.01) |
| *B01J 20/32* | (2006.01) |
| *B01J 20/34* | (2006.01) |

(52) U.S. Cl.
CPC ....... *B01J 20/041* (2013.01); *B01J 20/28035* (2013.01); *B01J 20/28052* (2013.01); *B01J 20/3085* (2013.01); *B01J 20/3204* (2013.01); *B01J 20/3221* (2013.01); *B01J 20/3236* (2013.01); *B01J 20/3297* (2013.01); *B01J 20/3433* (2013.01); *B01J 20/3475* (2013.01)

(58) Field of Classification Search
None
See application file for complete search history.

(56) References Cited

U.S. PATENT DOCUMENTS 6,187,056 B1 * 2/2001 Terziev .................. C11D 3/126
510/516

FOREIGN PATENT DOCUMENTS

CN          116119698 A   *  5/2023
WO      WO-2016073007 A1 *  5/2016  ............ B01J 20/041

OTHER PUBLICATIONS

Li et al. Journal of Sustainable Metallurgy, 2022, 8, 360-69 (Year: 2022).*

* cited by examiner

*Primary Examiner* — Yun Qian
(74) *Attorney, Agent, or Firm* — Snell & Wilmer L.L.P.

(57) ABSTRACT

Disclosed herein are compositions for extracting lithium from a brine, methods for utilizing compositions for extracting lithium from a brine, and/or methods for preparing a composition for extracting lithium from a brine. For example, a composition may include lithium aluminum hydroxide crystals having a crystal structure of a plurality of hexagonal sheets. In some instances, each of the plurality of hexagonal sheets includes one or more vacant sites. Moreover, the composition may include a plurality of reinforcing ions bonded to an outside edge of one or more of the plurality of hexagonal sheets. In some instances, the plurality of reinforcing ions supports the crystal structure of the plurality of hexagonal sheets when the composition is washed with a stripping fluid and maintains a separation distance between one or more of the plurality of hexagonal sheets.

17 Claims, 4 Drawing Sheets

400

START

Add restructuring elements to a sorbent material. ──410

Add scaffolding elements to the restructured sorbent material. ──420

Add the sorbent material with the scaffolding elements to a brine solution. ──430

END

SORBENT FOR LITHIUM EXTRACTION FROM BRINES

TECHNICAL FIELD

The present disclosure is generally directed to processing brines or brine solutions. More specifically, the present disclosure is directed to sorbent materials used to extract target constituents or constituents of interests from the brines or brine solutions.

BACKGROUND

Elements such as lithium are growing in demand today. One source for such elements are brine solutions that are located beneath the surface of the Earth. In some instances, the brine solutions may be pumped out and processed to extract the lithium from the brine solutions. For instance, the brine solutions may be placed into several evaporation ponds and, over time, the lithium may be extracted from the brine solutions as the water evaporates from the evaporation ponds.

SUMMARY

In some aspects, a composition is provided for extracting lithium from a brine. In some instances, the composition may include lithium aluminum hydroxide crystals having a crystal structure of a plurality of hexagonal sheets. In some cases, each of the plurality of hexagonal sheets includes one or more vacant sites. Moreover, the composition may include a plurality of reinforcing ions bonded to an outside edge of one or more of the plurality of hexagonal sheets. In some cases, the plurality of reinforcing ions supports the crystal structure of the plurality of hexagonal sheets when the composition is washed with a stripping fluid and maintains a separation distance between one or more of the plurality of hexagonal sheets.

In other aspects, a method is provided for preparing a composition for extracting lithium from a brine. In some instances, the method may include combining aluminum hydroxide and a lithium-based hydroxide salt to produce lithium aluminum hydroxide crystals having a crystal structure of a plurality of hexagonal sheets. Moreover, the method may include adding a reinforcing material to the lithium aluminum hydroxide crystals. In some cases, one or more ions from the reinforcing material are bonded to an outside edge of one or more of the plurality of hexagonal sheets.

BRIEF DESCRIPTION OF THE DRAWINGS

In order to describe the manner in which the features and advantages of this disclosure can be obtained, a more particular description is provided with reference to specific implementations thereof which are illustrated in the appended drawings. Understanding that these drawings depict only exemplary implementations of the disclosure and are not therefore to be considered to be limiting of its scope, the principles herein are described and explained with additional specificity and detail through the use of the accompanying drawings in which.

DETAILED DESCRIPTION

Figure 1:
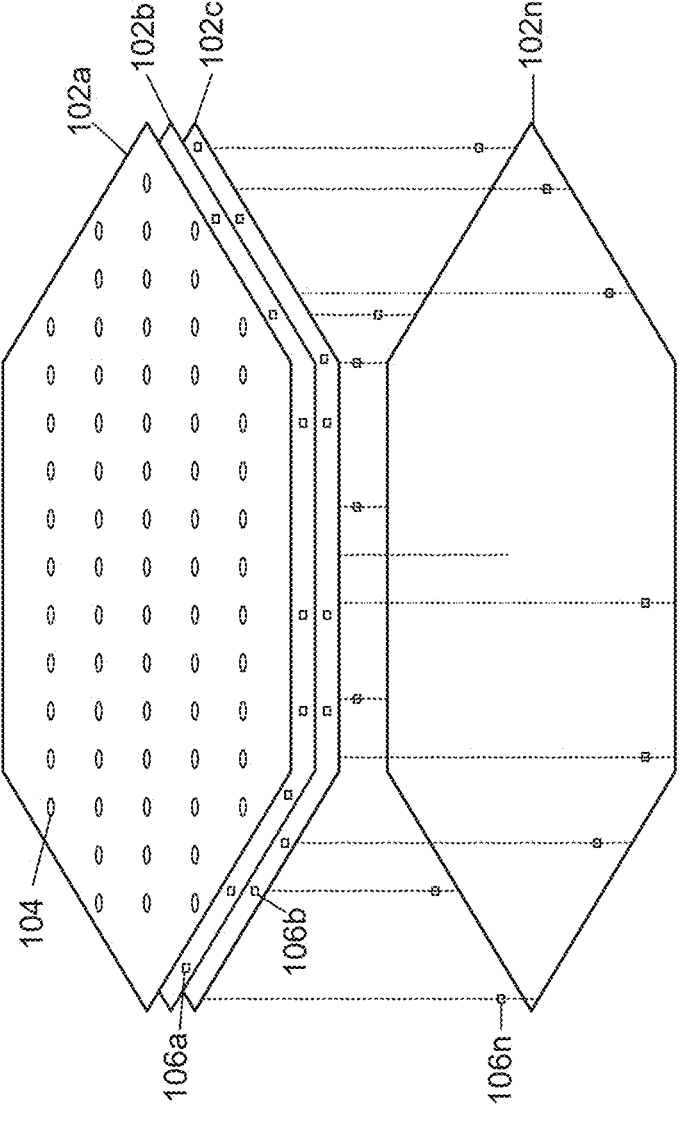
FIG. 1 illustrates an example lithium based sorbent material that extracts lithium ions from a brine or brine solution, in accordance with some aspects of the disclosed technology.

Various aspects of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the principles disclosed herein. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

It will be appreciated that for simplicity and clarity of illustration, where appropriate, reference numerals have been repeated among the different figures to indicate corresponding or analogous compounds. In addition, numerous specific details are set forth in order to provide a thorough understanding of the methods and apparatus described herein. However, it will be understood by those of ordinary skill in the art that the methods and apparatus described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the present disclosure.

In some examples, a system may extract, purify and concentrate target constituents or constituents of interests from a brine or brine solution. In such examples, the target constituent may be lithium. Additionally, the system may utilize a sorbent material for the adsorption of lithium ions from the brine. Moreover, the sorbent material may be a lithium based material, and after the sorbent material is saturated with lithium ions, a strip solution may utilized to "wash" or extract the sorbent material and remove the lithium ions for collection and concentration. In some instances, the strip solution including water, may be utilized to wash the lithium ions from the sorbent material. Due to the water in the strip solution, the lithium included in the lithium based sorbent material, along with the lithium ion extracted from the brine, may be removed. If too much lithium is removed from the lithium based sorbent material, such as in instances where the concentration of water in the strip solution is too high (e.g., the strip solution is pure water), the structure of the lithium based sorbent material (e.g., crystal structure) may collapse and may not be reused to subsequently extract additional lithium ions from other brines. As such, the strip solution may include some concentration of lithium to replace or regenerate any lithium removed or lost from the lithium based sorbent material during the washing of the lithium based sorbent material with the strip solution. However, in such instances, the amount of lithium ions that can be recovered may be limited due to the concentration of lithium in the strip solution.

Aspects of the disclosed technology provide solutions for strengthening the crystalline structure of a lithium based sorbent material so that a strip solution without lithium, such as a strip solution with a high concentration of water (e.g., pure water), may be utilized without causing the crystalline structure of the lithium based sorbent material to collapse. In some examples, the lithium based sorbent material may have a structure of a plurality of sheets, plates or membranes that are stacked on top of one another with a distance separating each of the plurality of sheets. Additionally, the sheets may each include one or more vacant sites/locations that attract lithium ions from the lithium-containing brine when the brine passes between the plurality of plates or membranes. In such examples, one or more reinforcing elements or ions may be included between each of the sheets. Additionally, the one or more reinforcing ions may be bonded to the sheets. The reinforcing ions may prevent the crystalline structure of the lithium based sorbent material from collapsing when the lithium based sorbent material is washed with the strip solution to remove the lithium ions from the lithium based sorbent material. Further, the reinforcing ions may maintain the distance separating each sheet in the stack so that the lithium-containing brine may pass between the plurality of sheets and have access to the vacant sites of the sheets.

As described herein, the brine solution (or brine), may include some concentration of lithium. Additionally, the brine solution may refer to any aqueous solution that contains a substantial amount of dissolved metals, such as alkali and/or alkaline earth metal salt(s) in water, wherein the concentration of salts can vary from trace amounts up to the point of saturation. Moreover, brine solution refers to both geothermal brines and waste or byproduct streams from industrial processes. Further, the brine solution may include alkali metal or alkaline earth chlorides, bromides, sulfates, hydroxides, nitrates, and the like, as well as natural brines. In some instances, the brine solution may include metals. Examples of elements that may be present in the brine solution include sodium, potassium, calcium, magnesium, lithium, strontium, barium, iron, boron, silica, manganese, chlorine, zinc, aluminum, antimony, chromium, cobalt, copper, lead, arsenic, mercury, molybdenum, nickel, silver, thallium, vanadium, and fluorine, although it is understood that other elements and compounds may also be present. In other instances, the brine solution may be obtained from natural sources, such as, Chilean brines or Salton Sea brines, geothermal brines, sea water, mineral brines (e.g., lithium chloride or potassium chloride brines), alkali metal salt brines, and industrial brines, for example, industrial brines recovered from ore leaching, mineral dressing, and the like. In various instances, the brine solution may be artificially prepared.

FIG. 1 illustrates an example lithium based sorbent material that adsorbs lithium ions from a lithium-containing brine or brine solution, in accordance with some aspects of the disclosed technology. As illustrated in FIG. 1, lithium based sorbent material 100 may have a structure that includes one or more of sheets 102, such as sheets 102a, 102b, 102c through 102n. Additionally, lithium based sorbent material 100 may include one or more reinforcing ions 106, such as reinforcing ions 106a, 106b through 106n.

As described herein, each sheet 102 may be stacked on top of one another without intersecting one another. Additionally, each sheet 102 may be separated by a distance from another sheet 102 by at least a distance equivalent to the atomic radius of lithium. Moreover, each sheet 102 may include one or more vacant sites 104 that may capture, draw or attract lithium ions out of a lithium-containing brine solution that includes the lithium ions. In some examples, the vacant sites 104 may be "size exclusive" and may only fit lithium ions/atoms. In such examples, lithium based sorbent material 100 may be one or more lithium aluminates. For example, when aluminum hydroxide is reacted with hydroxide salt (e.g., lithium hydroxide), lithium based sorbent material 100 (e.g., lithium aluminum hydroxide crystals) may be formed as the crystals extending out from aluminum hydroxide in the form of one or more stacks of sheets (e.g., sheets 102-102n). Each sheet may have large surface areas having sites, such as vacant sites 104, that accept ions that are of a certain size, such as lithium ions, and may attract the lithium ions into the vacant sites 104 through energy loss of the lithium ion, as the brine including the lithium ion flows or passes by. In some instances, each of the vacant sites 104 may be an octahedral hole. In such instances, and when lithium based sorbent material 100 is placed in a saturated brine that includes lithium ions, the lithium ions may pass in between sheets 102 and the lithium ion may be attracted to the hydroxide anions and drawn into the octahedral holes. In some instances, hydroxide anions reside between sheets 102. Moreover, the hydroxide anions may determine the spacing between sheets 102. Additionally, once the lithium ion is in the octahedral holes, the energy of the lithium ions drops and chloride in the saturated brine may follow the lithium ions into the octahedral hole. As such, a lithium compound, such as lithium chloride, may form. In other instances, each sheet 102 may include a repeating hexagonal lattice structure.

Additionally, each reinforcing ion 106 of lithium based sorbent material 100 may be between each sheet 102. In some examples, each reinforcing ion 106 may be attached or bonded to each sheet 102 reinforcing ion 106 is between. Additionally, reinforcing ion 106 may be bonded to the edge of sheet 102. For example, as illustrated in FIG. 1, reinforcing ion 106a may be attached to or bonded to the outside edge of sheet 102a and the edge of sheet 102b. In instances where each sheet 102 of lithium based sorbent material 100 includes lithium aluminum hydroxide crystals extending out of and from aluminum hydroxide, reinforcing ion 106a may be bonded to the aluminum hydroxide of a sheet 102. For instance, reinforcing ion 106a may be attached to or bonded to an aluminum hydroxide of sheet 102a and an aluminum hydroxide of sheet 102b. In some instances, each reinforcing ion 106 may be covalently bonded to one or more sheets 102. Addition of reinforcing ions (e.g., silicates or aluminates) that can react with crystal edges to form structures that may extend from layer to layer can help stabilize the crystal structure. For example, as described herein, reinforcing ions 106 may provide additional support for the crystalline structure of lithium based sorbent material 100, such that when lithium based sorbent material 100 is washed with a strip solution without lithium (e.g., pure water), lithium based sorbent material 100 does not collapse. As follows, depletion of lithium chloride from the structures can be achieved without collapsing the crystal lattice. Additionally, reinforcing ions 106 may maintain the distance separating each sheet 102 so that the lithium ions included in a lithium-containing brine may pass through and be adsorbed by vacant sites 104 of sheets 102 from the brine. In other instances, reinforcing ion 106 may be silicate based (e.g., silicate ions). In various instances, reinforcing ion 106 may be titanium based, aluminum based, tungsten based, or any other applicable soluble metal ions.

Figure 2:
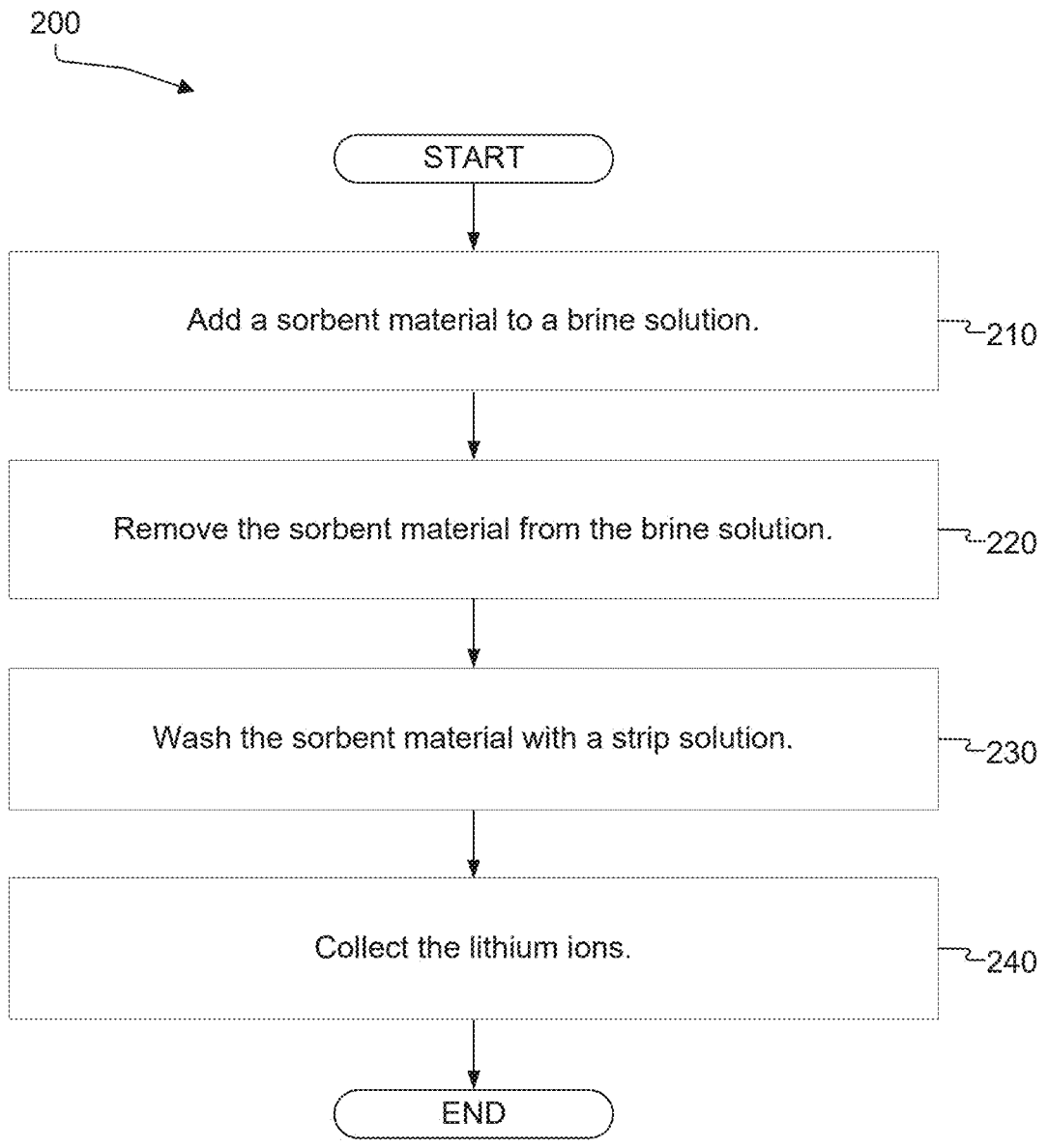
FIG. 2 illustrates an example flowchart for an example process for utilizing a lithium based sorbent material with one or more reinforcing ions to adsorb lithium ions from a brine or brine solution, in accordance with some aspects of the disclosed technology.

In some examples, lithium based sorbent material 100 may be utilized to adsorb lithium ions from a saturated lithium-containing brine or saturated brine solution. As described herein, the one or more reinforcing ions 106 of lithium based sorbent material 100 may prevent the crystalline structure of lithium based sorbent material 100 from collapsing when being washed by a strip solution without lithium, such as a strip solution of pure water, while maintaining the distance that separates each sheet 102. FIG. 2 is a flow chart for an example process 200 for utilizing a lithium based sorbent material with one or more reinforcing ions, such as lithium based sorbent material 100 with one or more reinforcing ions 106 of FIG. 1, to extract one or more lithium compounds from a lithium-containing brine solution. In the below description of FIG. 2, reference may be made to reference characters representing various features of FIG. 1.

As illustrated in FIG. 2, process 200 may include adding the sorbent material to a brine solution (e.g., step 210 of FIG. 2). As described herein, the brine solution may include some concentration of lithium, and may include other elements, such as chlorine. In some examples, lithium based sorbent material 100 may be added into the brine solution. In such examples, each sheet 102 may be lithium aluminum hydroxide crystals extending out of and from aluminum hydroxide. Additionally, each sheet 102 may include one or more vacant sites 104, such as octahedral holes, which may draw or attract lithium ions out of a brine solution and into the vacant sites 104. In some instances, hydroxide anions may reside between one or more of sheets 102. Moreover, lithium based sorbent material 100 may include one or more reinforcing ions 106. Reinforcing ions 106 may maintain the distance separating each sheet 102 so that the lithium ions included in the brine solution may pass between sheets 102 of lithium based sorbent material 100 and may be attracted to the vacant sites 104 of each sheet 102. In some instances, once the lithium ions are inside the vacant sites 104, the energy of the lithium ions may drop. Further, chloride in the brine solution may follow the lithium ions into the vacant sites 104 and form lithium chloride.

Additionally, process 200 may include removing the sorbent material from the brine solution (e.g., step 220 of FIG. 2). For example, lithium based sorbent material 100 may be saturated with lithium ions. Additionally, once lithium based sorbent material 100 is saturated with lithium ions, lithium based sorbent material 100 may be removed from the brine solution.

Moreover, process 200 may include washing the sorbent material with a strip solution (e.g., step 230 of FIG. 2) and collecting the removed lithium (e.g., step 240 of FIG. 2). As described herein, the strip solution may not have lithium. For example, lithium based sorbent material 100 saturated with lithium ions may be washed with a strip solution without lithium. The strip solution may remove the lithium ions adsorbed from the brine solution and the lithium ions may be collected and concentrated. As described herein, and in some instances, the lithium included in sheets 102 of lithium based sorbent material 100 may also be removed by the stripping fluid. The one or more reinforcing ions 106 of lithium based sorbent material 100 may provide additional support for the crystalline structure of lithium based sorbent material 100. Additionally, the reinforcing ions 106 may prevent the crystalline structure of lithium based sorbent material 100 from collapsing due to too much lithium being removed from sheets 102 of lithium based sorbent material 100 by the stripping solution. In some instances, each reinforcing ion 106 of lithium based sorbent material 100 may be in between each sheet 102. Additionally, each reinforcing ion 106 may be attached or bonded, such as covalently bonded to each sheet 102 the corresponding reinforcing ion 106 is between. Moreover, each reinforcing ion may be attached or bonded to the outside edge of sheets 102. For instance, reinforcing ion 106b may be attached to or bonded to the edge of sheet 102b and the edge of sheet 102 that is underneath sheet 102b.

Figure 3:
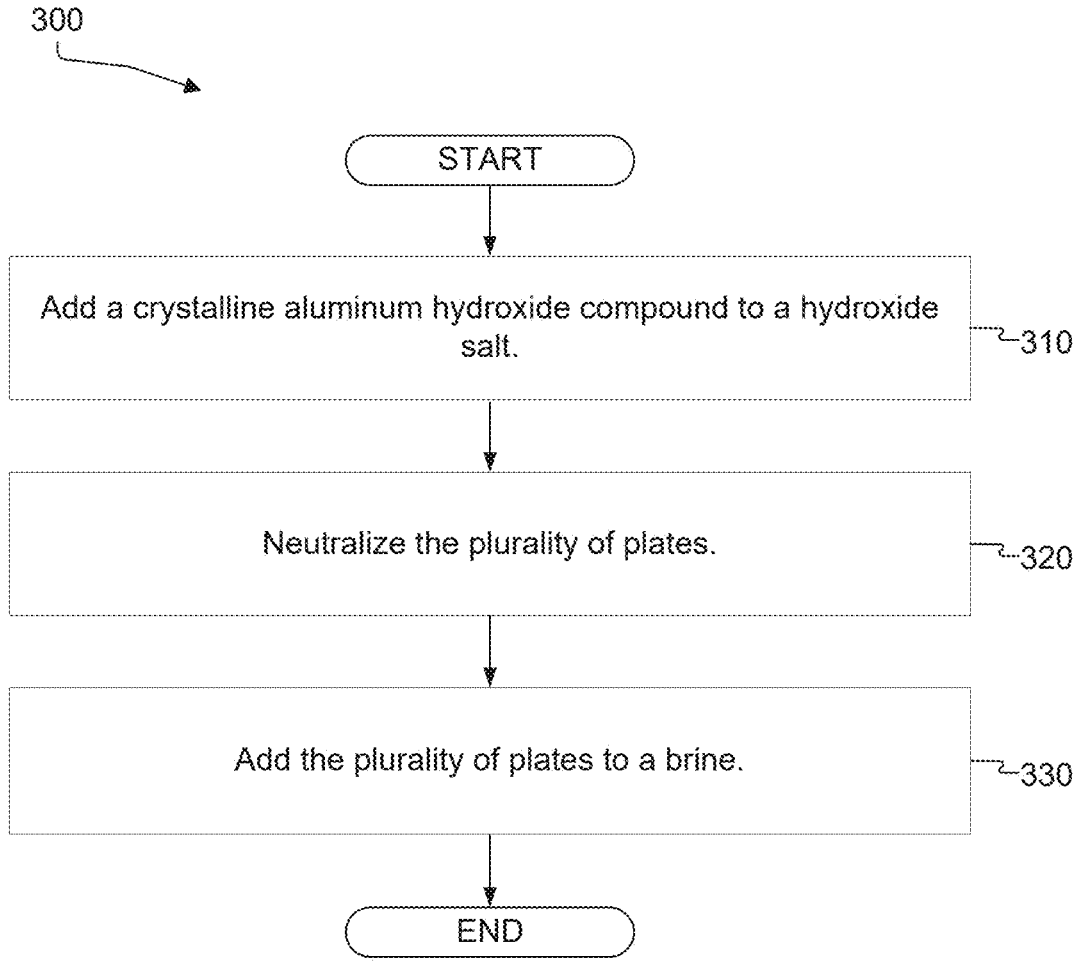
FIG. 3 illustrates an example flowchart for an example process for forming the lithium based sorbent material, in accordance with some aspects of the disclosed technology.

FIG. 3 is a flow chart for an example process 300 for forming the lithium based sorbent material. In the below description of FIG. 2, reference may be made to reference characters representing various features of FIG. 1. As illustrated in FIG. 3, process 300 may include adding a crystalline aluminum hydroxide compound (e.g., $AL(OH)_3$) to a hydroxide salt (e.g., step 310 of FIG. 3). Examples of a crystalline aluminum hydroxide compound include gibbsite, bayerite, or nordstromdite. Additionally, an example of the hydroxide salt may include a lithium based hydroxide salt, such as lithium hydroxide (e.g., a lithium hydroxide solution). In some instances, the lithium-based hydroxide salt may include lithium chloride (LiCl) and at least one of sodium hydroxide (NaOH) or potassium hydroxide (KOH). Moreover, heat (e.g., 90 degrees Celsius) may be added to the reaction between crystalline aluminum hydroxide and the hydroxide salt. Further, a reaction between the crystalline aluminum hydroxide compound and the hydroxide salt may yield the stack of sheets, such as stack of sheets 102 of FIG. 1 (e.g., lithium aluminum hydroxide crystals extending out of and from the aluminum hydroxide). In some examples, the combination of lithium chloride and sodium or potassium hydroxide may also yield the same stack of sheets as described above, such as the stack of sheets 102 of FIG. 1. In such examples, the salts must be in stoichiometric balance to yield the same stack of sheets. In other examples each of sheets 102 may include one or more vacant sites 104.

Additionally, process 300 may include neutralizing a plurality of sheets (e.g., step 320), such as the crystalline structure of each sheet 102 of the stack of sheets 102 of FIG. 1. In some examples, each sheet 102 may be neutralized with hydrochloric acid. In such examples, the hydrochloric acid may replace hydroxide ions of the stack of sheets 102 with chloride ions. Lithium based sorbent material 100 may include a stack of neutralized sheets 102.

Further, process 300 may include adding the plurality of neutralized sheets to a brine (e.g., step 330). For example, the neutralized sheets 102 of FIG. 1 may be in the form of a stack, as illustrated in FIG. 1. Additionally, one or more reinforcing ions 106 may be added to the stack of sheets 102, as described herein. Further, the stack of sheets 102, and in some instances, with one or more reinforcing ions 106, may be added to a lithium-containing brine solution including lithium ions to adsorb lithium ions from the brine solution, as described with FIG. 2 (e.g., process 200).

Figure 4:
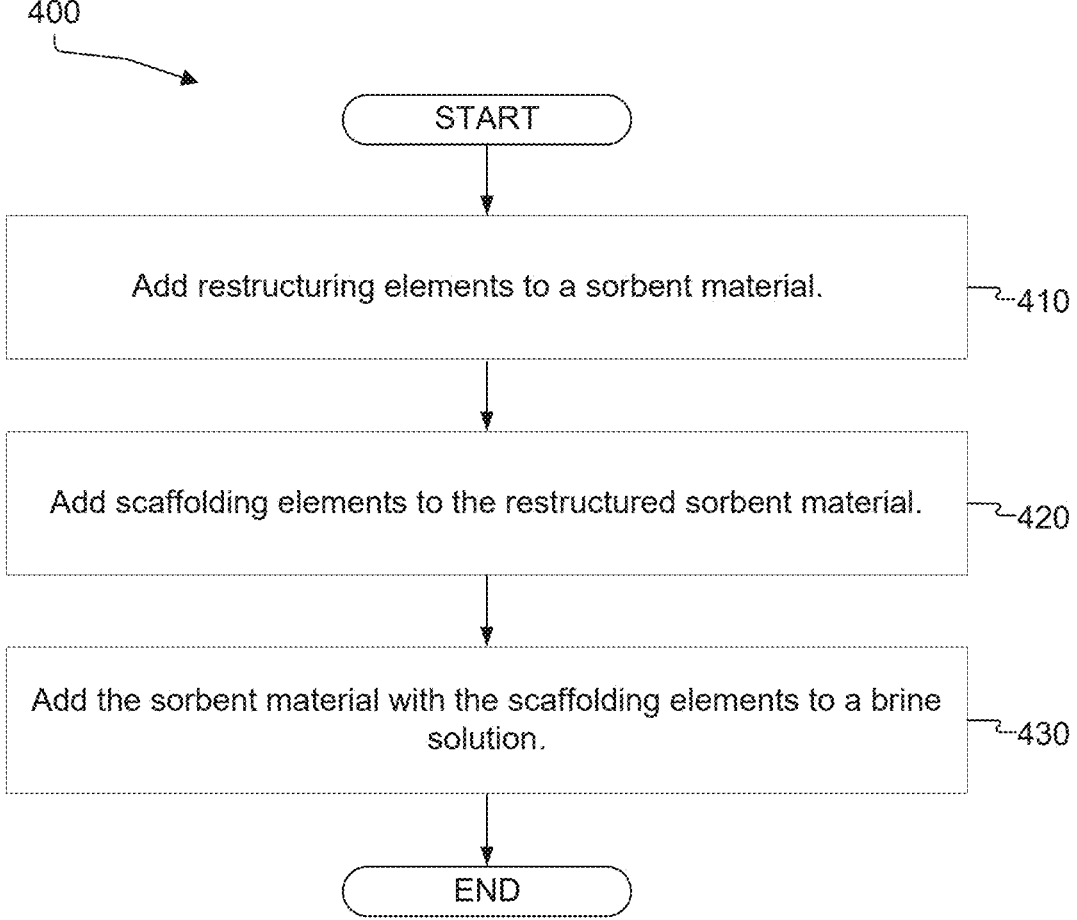
FIG. 4 illustrates an example flowchart for an example process for adding one or more reinforcing ions to the lithium based sorbent material, in accordance with some aspects of the disclosed technology.

FIG. 4 is a flow chart for an example process 400 for adding one or more reinforcing ions to the sorbent material. In the below description of FIG. 4, reference may be made to reference characters representing various features of FIG. 1. As illustrated in FIG. 4, process 400 may include adding restructuring elements, such as the previously described metal ions, to a sorbent material (e.g., step 410 of FIG. 4).

Additionally, process 400 may include adding reinforcing ions to the restructured sorbent material (e.g., step 420 of FIG. 4). In some examples, the reinforcing ions may include silicate (e.g., $SiO_4^{4-}$). In such examples, an amount sodium silicate may be added to a restructured lithium based sorbent material, such as lithium based sorbent material 100. Additionally, the silicate ions from the sodium silicate may be in between each sheet 102. Moreover, the silicate ions may be attached or bonded, such as covalently bonded, to sheets 102. For example, reinforcing ion 106*a*, which is silicate ion may be attached to or bonded to sheet 102*a* and sheet 102*b*. Additionally, the silicate ions may be bonded to the outside edges of sheets 102. For instance, reinforcing ion 106*a*, which is silicate ion may be attached to or bonded to the edge of sheet 102*a* and the edge of sheet 102*b*. As described herein, the silicate ions, or any type of reinforcing ions 106, may provide additional support for lithium based sorbent material 100, such that when lithium based sorbent material 100 is washed with a strip solution of a high concentration of water, such as pure water, lithium based sorbent material 100 does not collapse. Additionally, the silica may maintain the distance separating sheets 102 of the stack of sheets 102 so that the lithium ions included in the brine solution may pass between sheets 102 to be adsorbed by vacant sites 104 of sheets 102. In various examples, reinforcing ions, such as reinforcing ions 106, may include titanium.

Further, process 400 may include adding the plurality of sheets with the reinforcing ions to a brine solution (e.g., step 430 of FIG. 4). In some examples, the plurality of sheets with the reinforcing ions, such as sheets 102 and reinforcing ions 106 of lithium based sorbent material 100 of FIG. 1, may be added to a lithium-containing brine solution. In such examples, the plurality of sheets may absorb the lithium ions from the lithium-containing brine solution. The plurality of sheets may be saturated of lithium ions over time.

For clarity of explanation, in some instances the present technology may be presented as including individual functional blocks including functional blocks comprising devices, device components, steps or routines in a method implemented in software, or combinations of hardware and software.

In some instances, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific examples and aspects thereof, but those skilled in the art will recognize that the application is not limited thereto. Thus, while illustrative examples and aspects of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, examples and aspects of the systems and techniques described herein can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate examples, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the method, algorithms, and/or operations described above. The computer-readable data storage medium may form part of a computer program product, which may include packaging materials.

The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Methods and apparatus of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Such methods may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

In the above description, terms such as "upper," "upward," "lower," "downward," "above," "below," "downhole," "uphole," "longitudinal," "lateral," and the like, as used herein, shall mean in relation to the bottom or furthest extent of the surrounding wellbore even though the wellbore or portions of it may be deviated or horizontal. Correspondingly, the transverse, axial, lateral, longitudinal, radial, etc., orientations shall mean orientations relative to the orientation of the wellbore or tool.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or another word that substantially modifies, such that the component need not be exact. For example, substantially cylindrical means that the object resembles a cylinder, but can have one or more deviations from a true cylinder.

The term "radially" means substantially in a direction along a radius of the object or having a directional component in a direction along a radius of the object, even if the object is not exactly circular or cylindrical. The term "axially" means substantially along a direction of the axis of the object. If not specified, the term axially is such that it refers to the longer axis of the object.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A composition for extracting lithium from a brine, the composition comprising:

a structure comprising a plurality of hexagonal sheets comprising lithium aluminum hydroxide and chloride ions and/or hydroxide anions between the plurality of hexagonal sheets, each of the plurality of hexagonal sheets comprising one or more vacant sites, wherein each respective hexagonal sheet of the plurality of hexagonal sheets is separated from a next hexagonal sheet by a separation distance, wherein two or more of the plurality of hexagonal sheets are stacked on top of one another without intersecting; and one or more ions from a reinforcing material bonded to an outside edge of one or more of the plurality of hexagonal sheets and between each of the plurality of hexagonal sheets, wherein the one or more ions from the reinforcing material supports a crystal structure of the plurality of hexagonal sheets when the composition is washed with a stripping fluid and maintains the separation distance between one or more of the plurality of hexagonal sheets, and wherein the one or more reinforcing ions includes at least one of titanium ions, aluminum ions, tungsten ions, or silicate ions.

2. The composition of claim 1, wherein the plurality of hexagonal sheets is formed from reacting aluminum hydroxide and a hydroxide salt.

3. The composition of claim 2, wherein the hydroxide salt is a lithium hydroxide solution.

4. The composition of claim 2, wherein the hydroxide salt is obtained from a combination of lithium chloride and at least one of sodium hydroxide and potassium hydroxide.

5. The composition of claim 2, wherein the aluminum hydroxide is obtained from at least one of gibbsite, bayerite, nordstrandite, and a combination thereof.

6. The composition of claim 1, wherein the one or more ions from the reinforcing material comprise silicate ions.

7. The composition of claim 1, wherein the plurality of hexagonal sheets is in a repeating hexagonal lattice structure.

8. The composition of claim 1, wherein each of the one or more ions from the reinforcing material are covalently bonded to the outside edge of the plurality of hexagonal sheets.

9. The composition of claim 1, wherein the one or more ions from the reinforcing material comprise titanium ions.

10. The composition of claim 1, wherein the plurality of hexagonal sheets is neutralized with hydrochloric acid.

11. The composition of claim 1, wherein the vacant sites are in a plane substantially perpendicular to a plane of the separation distance, and wherein lithium ions reside in the one or more vacant sites.

12. The composition of claim 1, wherein each of the one or more vacant sites is an octahedral hole.

13. The composition of claim 1, wherein the plurality of hexagonal sheets is added to a lithium-containing brine solution, and wherein each of the one or more vacant sites attract lithium ions from the lithium-containing brine solution.

14. The composition of claim 1, wherein hydroxide anions reside between the plurality of hexagonal sheets.

15. The composition of claim 1, wherein the separation distance between each sheet of the plurality of hexagonal sheets is a distance equivalent to at least the atomic radius of lithium when the brine passes between the plurality of hexagonal sheets.

16. The composition of claim 1, wherein the one or more ions from the reinforcing material include one or more of silicate or aluminate ions.

17. The composition of claim 16, wherein the plurality of hexagonal sheets extend out of and from aluminum hydroxide.

\*    \*    \*    \*    \*